United States Patent
Sone

(10) Patent No.: US 7,376,570 B2
(45) Date of Patent: May 20, 2008

(54) SYSTEM AND METHOD FOR CUSTOMER SATISFACTION SURVEY AND ANALYSIS FOR OFF-SITE CUSTOMER SERVICE

(75) Inventor: Masahiro Sone, Raleigh, NC (US)

(73) Assignee: Fujitsu Limited, Kanagawa (JP)

( * ) Notice: Subject to any disclaimer, the term of this patent is extended or adjusted under 35 U.S.C. 154(b) by 671 days.

(21) Appl. No.: 10/103,036

(22) Filed: Mar. 21, 2002

(65) Prior Publication Data

US 2003/0182135 A1    Sep. 25, 2003

(51) Int. Cl.
*G06Q 99/00* (2006.01)
(52) U.S. Cl. .................. 705/1; 370/352; 379/88.22
(58) Field of Classification Search .......... 705/26, 705/10; 709/218, 249; 714/43, 48; 717/178; 370/351, 401, 463, 252, 356; 379/88, 88.22
See application file for complete search history.

(56) References Cited

U.S. PATENT DOCUMENTS

| | | | |
|---|---|---|---|
| 4,881,261 A | 11/1989 | Oliphant et al. | |
| 5,034,807 A | 7/1991 | Von Kohorn | |
| 5,227,874 A | 7/1993 | Von Kohorn | |
| 5,867,562 A | 2/1999 | Scherer | |
| 5,950,172 A * | 9/1999 | Klingman | 705/26 |
| 6,577,713 B1 * | 6/2003 | Peterson et al. | 379/88.22 |
| 6,611,867 B1 * | 8/2003 | Bowman-Amuah | 709/224 |
| 6,671,818 B1 * | 12/2003 | Mikurak | 714/4 |
| 6,704,303 B1 * | 3/2004 | Bowman-Amuah | 370/352 |
| 6,707,812 B1 * | 3/2004 | Bowman-Amuah | 370/353 |
| 2003/0198218 A1 * | 10/2003 | Farris et al. | 370/356 |
| 2004/0093257 A1 * | 5/2004 | Rogers et al. | 705/10 |

OTHER PUBLICATIONS

Berkley, Blair J Gupta, Amit; Identifying the information requirements to deliver quality service; 1995; International Journal of Service Industry Management; v6n5; p. 16-35.*

* cited by examiner

*Primary Examiner*—James P. Trammell
*Assistant Examiner*—Behrang Badii
(74) *Attorney, Agent, or Firm*—Christie, Parker & Hale, LLP

(57) ABSTRACT

A system and method for customer satisfaction survey for a customer service provided over a telephone network. A customer initiates a telephone call to a customer service number provided by a company. The company's PBX receives the call and transfers it to a computer telephony integration (CTI) server for dynamically assigning an available customer service representative to the call. During the course of a call, the CTI server monitors the call for push-tones transmitted by the caller. Receipt of a push-tone during the conversation is assumed to be an indication of the customer's satisfaction associated with the call at the time the push-tone was transmitted. The CTI server also presents questions to the customer at the end of the call but prior to hangup to receive additional feedback about the customer's satisfaction about the call. The gathered information is stored as customer satisfaction data for later analysis by an analysis computer.

9 Claims, 5 Drawing Sheets

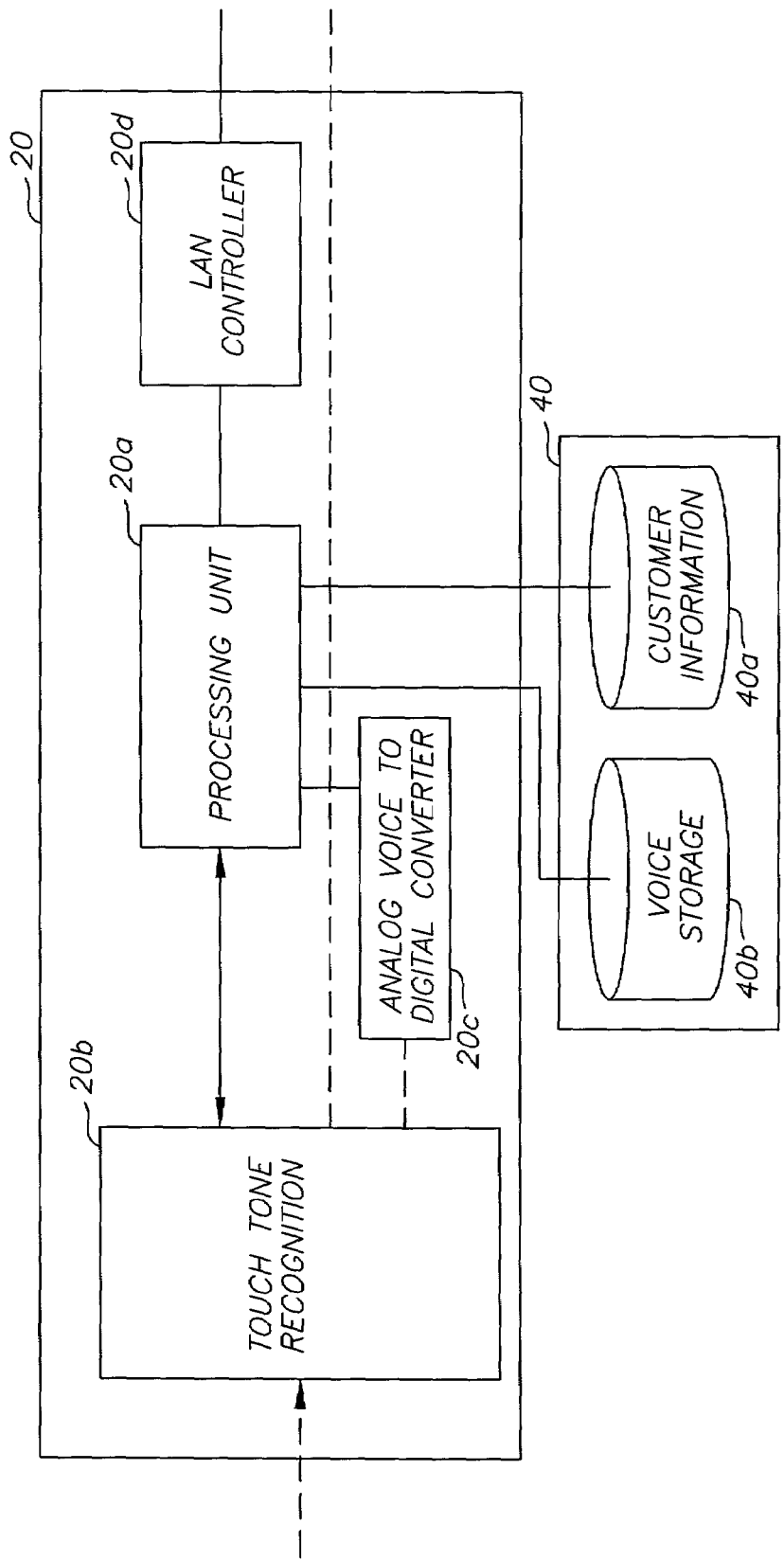

SYSTEM AND METHOD FOR CUSTOMER SATISFACTION SURVEY AND ANALYSIS FOR OFF-SITE CUSTOMER SERVICE

FIELD OF THE INVENTION

The present invention relates generally to improving the quality of customer service, and more particularly, to an automated system and method for receiving and measuring customer satisfaction levels for an off-site customer service.

BACKGROUND OF THE INVENTION

In today's competitive market where one company's product and price are indistinguishable from another's, companies often attempt to gain edge over their competitors by offering better customer service and support. For instance, many companies provide toll-free phone numbers that customers can call to obtain help and/or answers to questions from a representative of the company.

Customers, however, may become dissatisfied in using such toll-free phone numbers for numerous reasons. Often, if there are not enough representatives to handle the incoming calls, a calling customer may have to wait a considerable amount of time for a representative to become available. Although the customer does not generally incur phone charges during the call, in today's fast-paced world, the customer may not have the time to wait for a representative to become available.

Customers may also go through numerous transfers to different departments or representatives before finally being connected to an appropriate representative. The customer may also at times have to wait for a call-back from the representative if the representative cannot provide an immediate answer or help the customer. This again may result in long waits and cause frustration on the part of the customer.

Even if the customer is promptly connected to an appropriate representative, the customer may still be dissatisfied if the representative lacks the skill to provide the aid requested by the customer. Furthermore, the representative may fail to be courteous and offend the customer with his or her tone of voice or manner of speech.

A customer dissatisfied for any of the above reasons may decide to have no further relations with the company and instead, start to deal with the company's competitor. Thus, it is important to promptly identify the areas of dissatisfaction and take corrective measures to enhance the quality of customer service. To achieve this, companies may decide to randomly select and record a conversation between a customer and a representative for later review by a supervisor for level of skill and courtesy. Some companies may mail survey forms or place follow-up phone calls to the customers and inquire about their satisfaction of a the service received.

The above described methods, however, gather information about a customer's satisfaction substantially after a call has been completed. Therefore, the information gathered may not accurately reflect the customer's feelings at the time of the call. Furthermore, the described manual methods of gathering and analyzing customer satisfaction information are generally inefficient, time-consuming, and unreliable.

Accordingly, there is a need for a system and method for gathering a customer's satisfaction level contemporaneously with a current call. Such a system should also provide automation for efficiently gathering and analyzing customer satisfaction information.

SUMMARY OF THE INVENTION

The present invention addresses and alleviates the above-mentioned deficiencies associated with the prior art. In one embodiment, the present invention is directed to a method for customer satisfaction survey where the method includes establishing telephonic communication between a first user and a second user, receiving telephone signaling data during course of the telephonic communication, translating the telephone signaling data to a satisfaction rating, associating the satisfaction rating with a portion of the telephonic communication, and storing the satisfaction rating in a data store.

In another embodiment, the invention is directed to a method for customer satisfaction survey where the method includes establishing telephonic communication between a first user and a second user, prompting the first user to enter a satisfaction rating at an end of conversation between the first user and the second user, receiving telephone signaling data in response to the prompt, translating the telephone signaling data to a satisfaction rating, associating the satisfaction rating with the telephonic communication, and storing the satisfaction rating in a data store.

In a further embodiment, the invention is directed to a system for acquiring customer satisfaction information. The system includes a local switch establishing telephonic communication between a first user and a second user. A recognition module coupled to the local switch receives telephone signaling data during course of the telephonic communication and translates the telephone signaling data to a satisfaction rating. A processing unit coupled to the recognition module associates the satisfaction rating with a portion of the telephonic communication, and a data store stores the satisfaction rating.

In another embodiment, the system for acquiring customer satisfaction information includes a local switch establishing telephonic communication between a first user and a second user. A processing unit prompts the first user to enter a satisfaction rating at an end of conversation between the first user and the second for associating with the telephonic communication. A recognition module coupled to the processor receives telephone signaling data in response to the prompt and translates the telephone signaling data to a satisfaction rating. A data store stores the satisfaction rating.

It should be appreciated, therefore, that the present system and method allows customers to provide input about their satisfaction levels while the impression is still fresh in their minds. Furthermore, the present system and method allows companies to gather the satisfaction data efficiently and reliably without having to engage in manual surveys as done in the prior art.

BRIEF DESCRIPTION OF THE DRAWINGS

These and other features, aspects and advantages of the present invention will be more fully understood when considered with respect to the following detailed description, appended claims, and accompanying drawings where:

FIG. 2 is a more detailed block diagram of a computer telephony integration server according to one embodiment of the invention;

DETAILED DESCRIPTION

In general terms, the present invention is directed to an electronic system and method for surveying and analyzing the level of customer satisfaction for an off-site customer service accessed via telephonic communication. Preferably, the customer satisfaction information is gathered through interactions with the calling customer prior to hangup, either during or after the end of a conversation with a customer service representative. In this way, the customer may provide immediate feedback of his or her satisfaction of how the call was handled to the company providing the customer service. Based on the analysis of such user feedback, the company may take action to improve the quality of its customer service if necessary.

Figure 1:
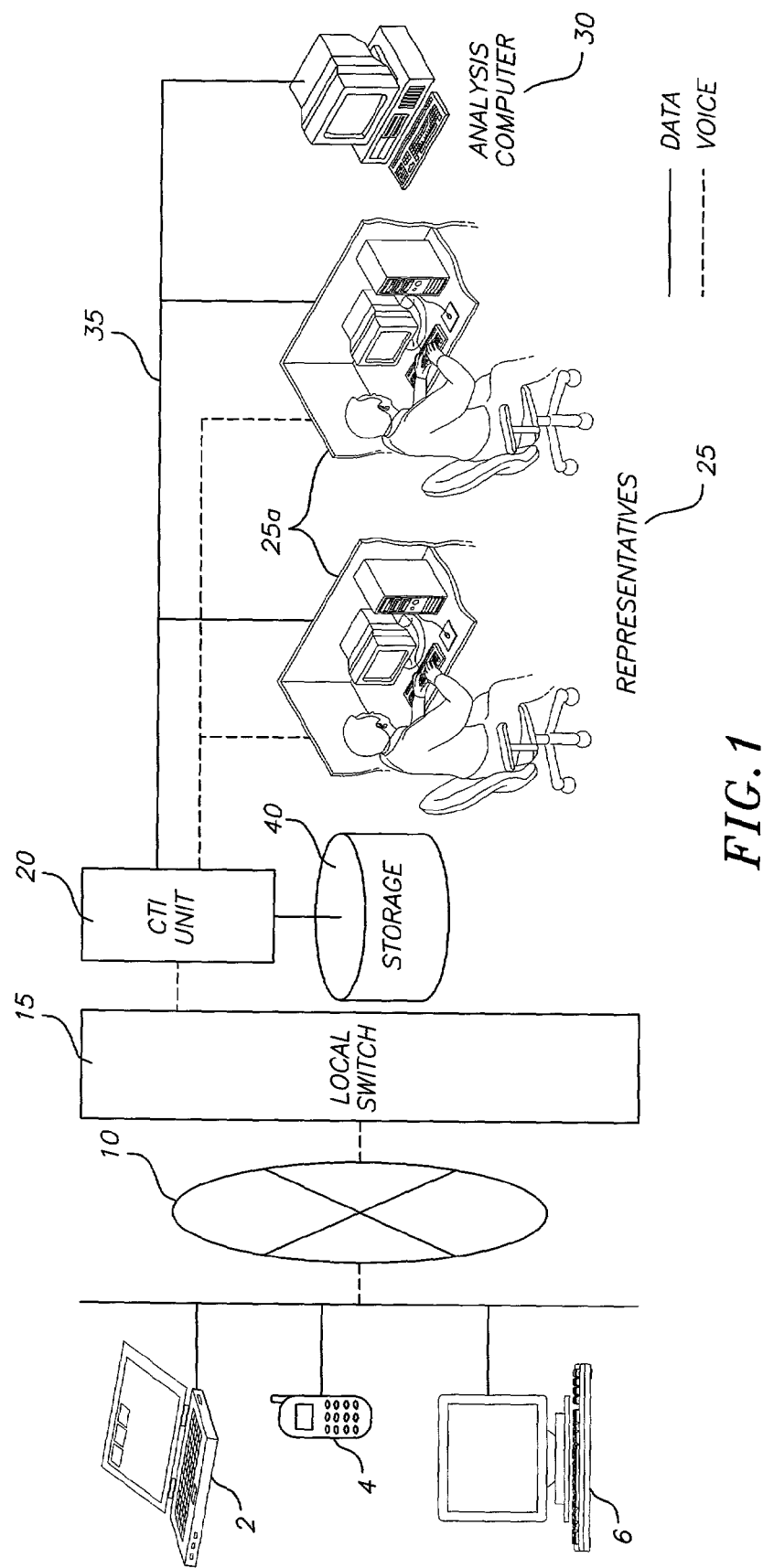
FIG. 1 is a schematic block diagram of a customer survey and analysis system according to one embodiment of the invention.

FIG. 1 is a schematic block diagram of a customer survey and analysis system according to one embodiment of the invention. The system includes a communication device accessible by a customer for initiating or responding to a telephonic communication with a customer service representative. Such a device may include a telephone 2, wireless phone 4, computer 6, or the like.

The system further includes a public and/or private telephone network 10 including local exchange companies (e.g. Ameritech and Pacific Bell) and inter-exchange carriers (e.g. AT&T, MCI, and Sprint) for routing the customer's telephone call to a called telephone number. The telephone network is coupled to a local switch 15 managing the receipt and transmission of calls for a particular location. Preferably, the local switch 15 is a Private Branch Exchange (PBX) managing the calls within a company. A person skilled in the art should recognize, however, that the local switch may be any known local switching device, such as a Centrex where a local telephone company's switch or a separate switch acts as the PBX.

The local switch 15 is coupled to a computer telephony integration (CTI) server 20 for processing an incoming call and directing the call to a particular customer service representative 25. The CTI server 20 further gathers customer satisfaction data about the call and stores it in a mass storage device 40 taking the form of a hard disk drive or drive array. The mass storage device preferably also stores customer profile information and information about the outcome of the calls.

Each customer service representative 25 has access to a computer terminal 25a coupled to the CTI server 20 preferably via a local area network 35. The customer service representative 25 uses the computer terminal 25a to store and retrieve customer-related information to and from the mass storage device 40.

The CTI server 20 is also coupled to an analysis computer 30 through the local area network 35. The analysis computer 30 retrieves the customer satisfaction data from the mass storage device and provides analysis of the data for use by the company to improve their customer service if necessary.

In its most basic feature, a particular customer initiates a telephone call to a customer service number provided by a company. The call is routed through various devices within the telephone network 10 before the call is received by the local switch 15. Generally, a switch at the caller's local exchange company transports a long-distance call to an inter-exchange switch, and the inter-exchange switch transports the call to a switch at the callee's local exchange company. The switch at the callee's local exchange company then transports the call to the company's local switch 15.

The company's local switch 15 receives the call and transfers it to the CTI server 20 for dynamically assigning an available customer service representative 25 to the call. The customer service representative 25 handling the call preferably retrieves information about an existing customer from the mass storage device 40 using his or her computer terminal 25. If no information about the customer exists in the mass storage device 40, the representative creates a new record for the customer with the customer's profile information. The representative also uses the computer terminal 25 to enter additional information about the call, including the reason for the call and/or the results of the call.

During the course of a call, the CTI server 20 monitors the call for push-tones transmitted by the caller. Receipt of a push-tone during the conversation is preferably assumed to be an indication of the customer's satisfaction associated with the call at the time the push-tone was transmitted. Thus, the customer may indicate dissatisfaction or satisfaction at specific instances during the call while the impression is fresh in the customer's mind.

The CTI server 20 also presents questions to the customer at the end of the call but prior to hangup to receive additional feedback about the customer's satisfaction about the call. The gathered information is stored in the mass storage device 40 for later analysis by the analysis computer 30.

The analysis computer 30 allows statistical analysis and creation of reports based on the customer satisfaction information stored in the mass storage device 40. The analyses and reports may be done for each representative, customer, geographic location, and the like. For instance, the analysis computer 30 may run a search and retrieval routine on the mass storage device 40 for customer satisfaction information associated with a particular customer service representative. The retrieved information may be analyzed to take corrective actions if the customer satisfaction levels for the customer service representative are below a predetermined threshold. Alternatively, rewards or incentives may be provided to the representative if the customer satisfaction levels are above a predetermined threshold.

FIG. 2 is a more detailed block diagram of the CTI server 20 according to one embodiment of the invention. The CTI server 20 includes a touch-tone recognition module 20b which responds to an in-coming call and provides initial instructions to the caller. For instance, the touch-tone recognition module 20b may inform the caller of the available services and a mode of selecting the desired services. Preferably, the touch-tone recognition module 20b instructs the customer to provide customer satisfaction information by selecting a touch-tone button on the customer's telephone with a number indicative of the level of customer satisfaction experienced at any point during the call. The touch-tone recognition module 20b may further provide instructions to press a pre-determined touch-tone button prior to hang-up to indicate an end of conversation with the customer service representative.

According to one embodiment of the invention, the touch-tone recognition module 20b is programmed to ask the customer a predetermined set of questions at the end of conversation between the customer and the customer service representative. The questions are preferably aimed to gather additional feedback about the customer about his or her satisfaction with the call. The customer again provides answers to the questions by selecting a touch-tone button on the telephone with a number corresponding to the desired answer. Alternatively, the questions and answers are provided through voice-recognition, automated agent, or other mechanisms known in the art.

The touch-tone recognition module 20a preferably includes logic for discerning, according to well-known mechanisms, whether data received from the local switch 15 is voice data or telephone signaling data (touch-tone data). Touch-tone data received after a conversation has begun with a customer service representative 25 is preferably presumed to be user satisfaction data. Such user satisfaction data is transferred to a processing unit 20b which locates an appropriate customer record in the customer information database 40a of the mass storage device 40 and stores the user data in the identified customer record.

Voice data is preferably transferred to an analog to digital converter 20c to convert analog voice data to digital data. The analog to digital converter 20c then transfers the converted voice data to the processing unit 20b. The processing unit 20b indexes the voice data based on the time in which the voice data was received, and stores it in a voice storage database 40b of the mass storage device 40.

The CTI server 20 further includes a LAN controller 20 preferably acting as an interface between the processing unit 20a, and the computer terminals 25a and the analysis computer 30. The LAN controller 20 preferably provides customer record information to the computer terminals 25a and the analysis computer 30. The LAN controller 20 also receives information from the computer terminals 25a about the calls being handled by the customer service representatives. Such information may include customer profile information and information on the outcome of the call. This information is transferred to the processing unit 20b for storing the received information in the appropriate customer record.

Figure 3A:
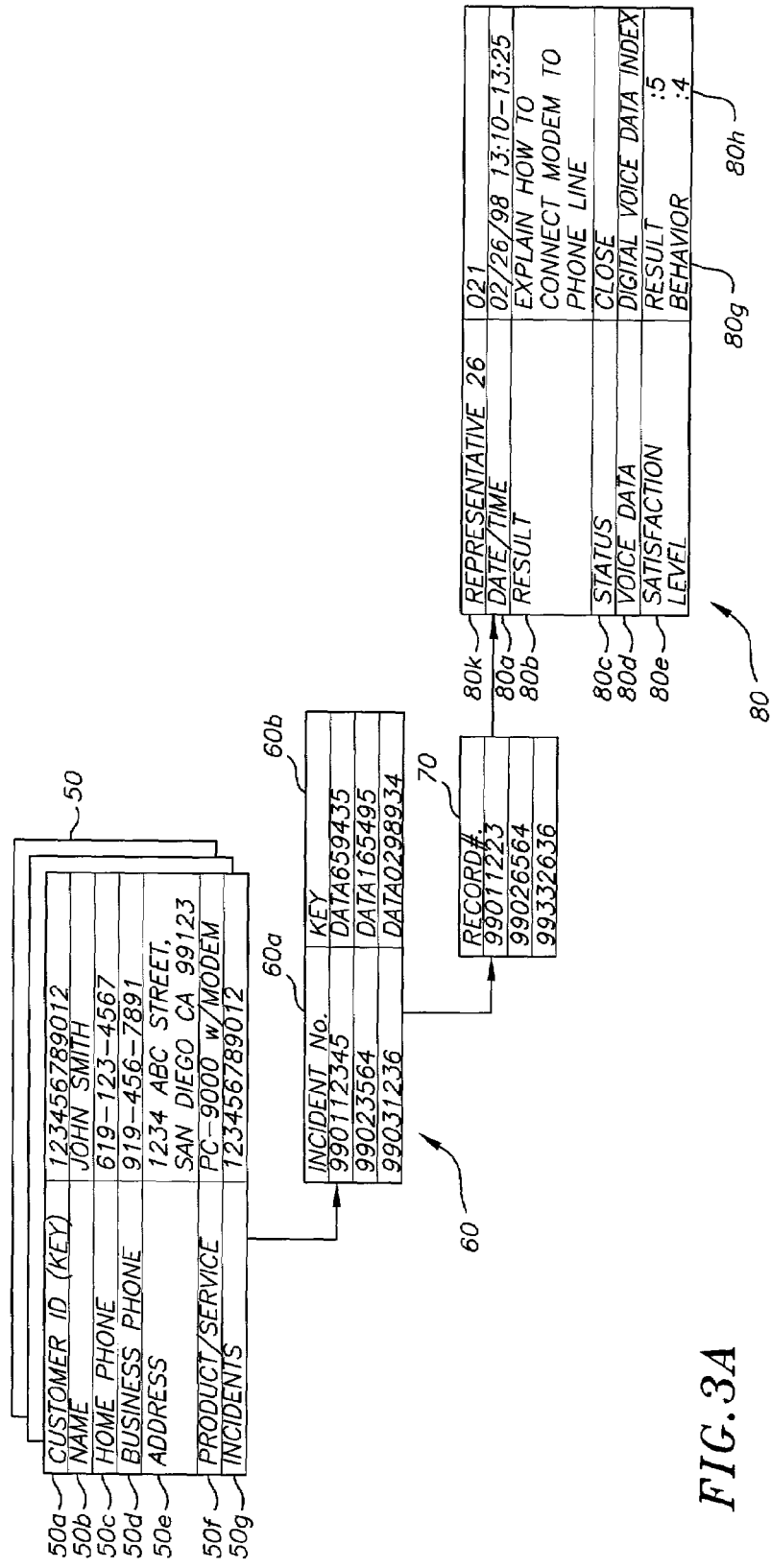
FIGS. 3A-3B are schematic diagrams of a customer information database according to one embodiment of the invention.

FIG. 3A is a schematic diagram of a layout of the customer information database 40a according to one embodiment of the invention. The database includes a series of customer specific records (identified generally at 50) each of which is headed and identified by a customer ID 50a. The customer ID 50a is preferably used as a key for identifying customer records associated with the calling customers. Following the customer ID 50a, each customer record 50 preferably includes the name 50b of the customer, the customer's home phone 50c, the customer's business phone 50d, and the customer's address 50e. Each customer record preferably further includes a product or service 50f purchased by the customer. Preferably, the customer service provided to the customer is associated with the purchased product or service.

An incidents field 50g of the customer record maintains track of the calls made by the customer to the customer service number. Each call is associated with a unique incident number 60a preferably stored in a separate incidents table 60. Each incident number 60a is preferably associated with a key 60b used to retrieve an incident record number 70 identifying the appropriate incident record 80. Alternatively, the incident number 60a itself is used as a key to identify the corresponding incident record number 70.

Each incident record 80 identified by the incident record number 70 preferably includes a representative ID 80k identifying the customer representative handling the particular call. A date/time field 80a indicates a date on which the call was received, and the start and end times of the conversation. A result field 80b of the incident record 80 provides information of the outcome of the call. This information is preferably manually entered by the customer service representative through his or her computer terminal 25a.

Each incident record 80 further includes a status field 80c indicating whether the incident was handled to completion, or whether the case remains open for later follow-up. Furthermore, a voice data field 80d provides an index to the recorded phone conversation stored in the temporary voice storage database 40b, allowing the review of the phone conversation at a later time.

A satisfaction level field 80e includes customer satisfaction levels provided by the customer prior to hangup of the call. According to one embodiment of the invention, the touch-tone recognition module 20b prompts the user to use the customer's touch-tone phone to rate various aspects of the call after completion of the call but prior to hangup. For example, the customer may be asked to rate his or her satisfaction with the waiting time, the result of the call, the representative's behavior, and the like. The rated areas 80f and the ratings 80g given to those areas are saved in the satisfaction level field 80e.

Figure 3B:
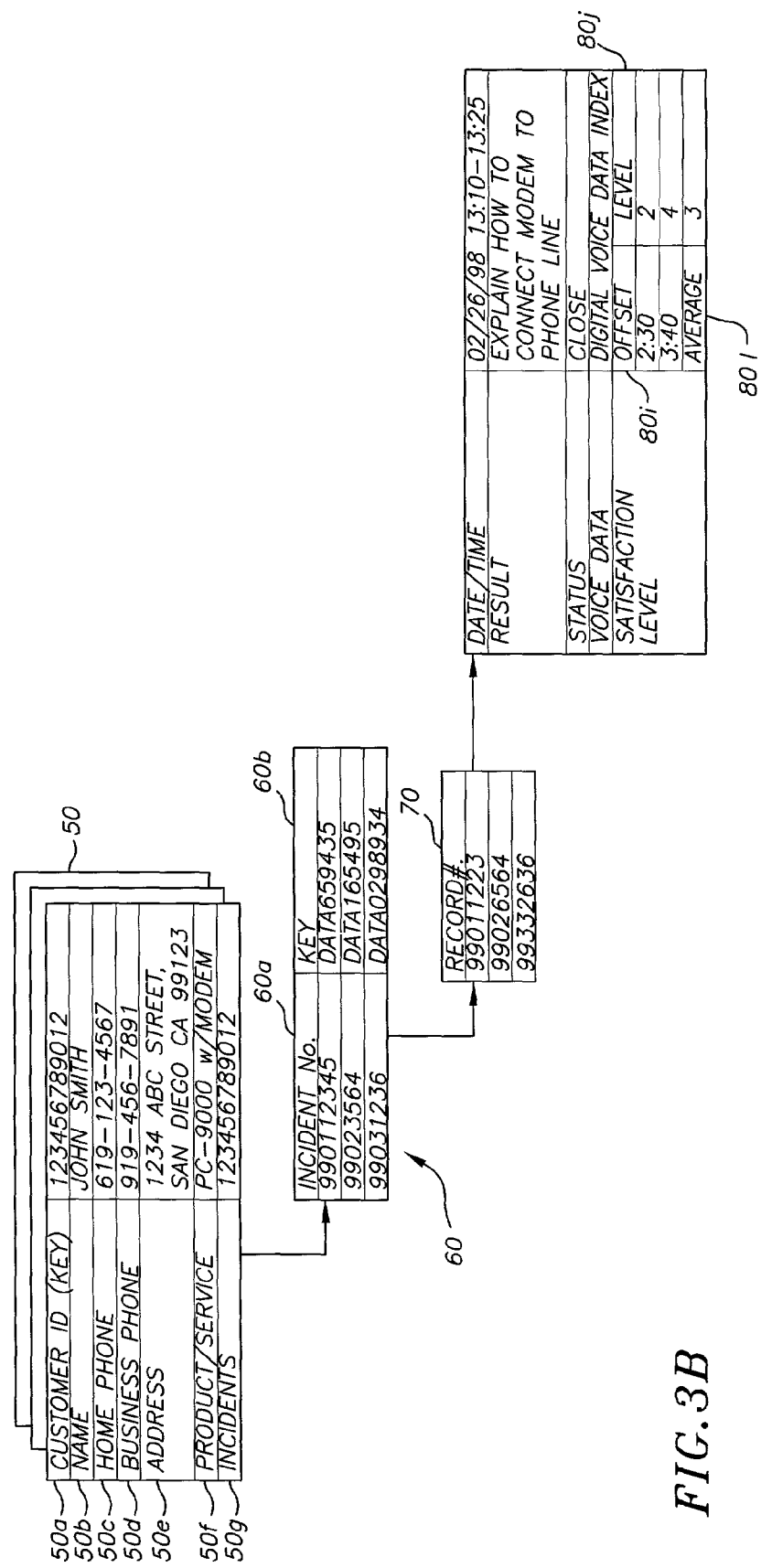

The satisfaction level field 80e may also depict customer satisfaction during the conversation with the customer service representative. As illustrated in FIG. 3B, an offset field 80i acts as an index to the portion of the conversation being rated. Preferably, the offset field identifies the relevant portion of the conversation by indicating an offset time from the beginning of the phone conversation. A level field 80j indicates a customer satisfaction level associated with the identified portion of the conversation. An average field 80l indicates an average of the customer satisfaction levels stored in the various level fields 80j. The average may be used to infer an overall customer satisfaction with the call.

Figure 4:
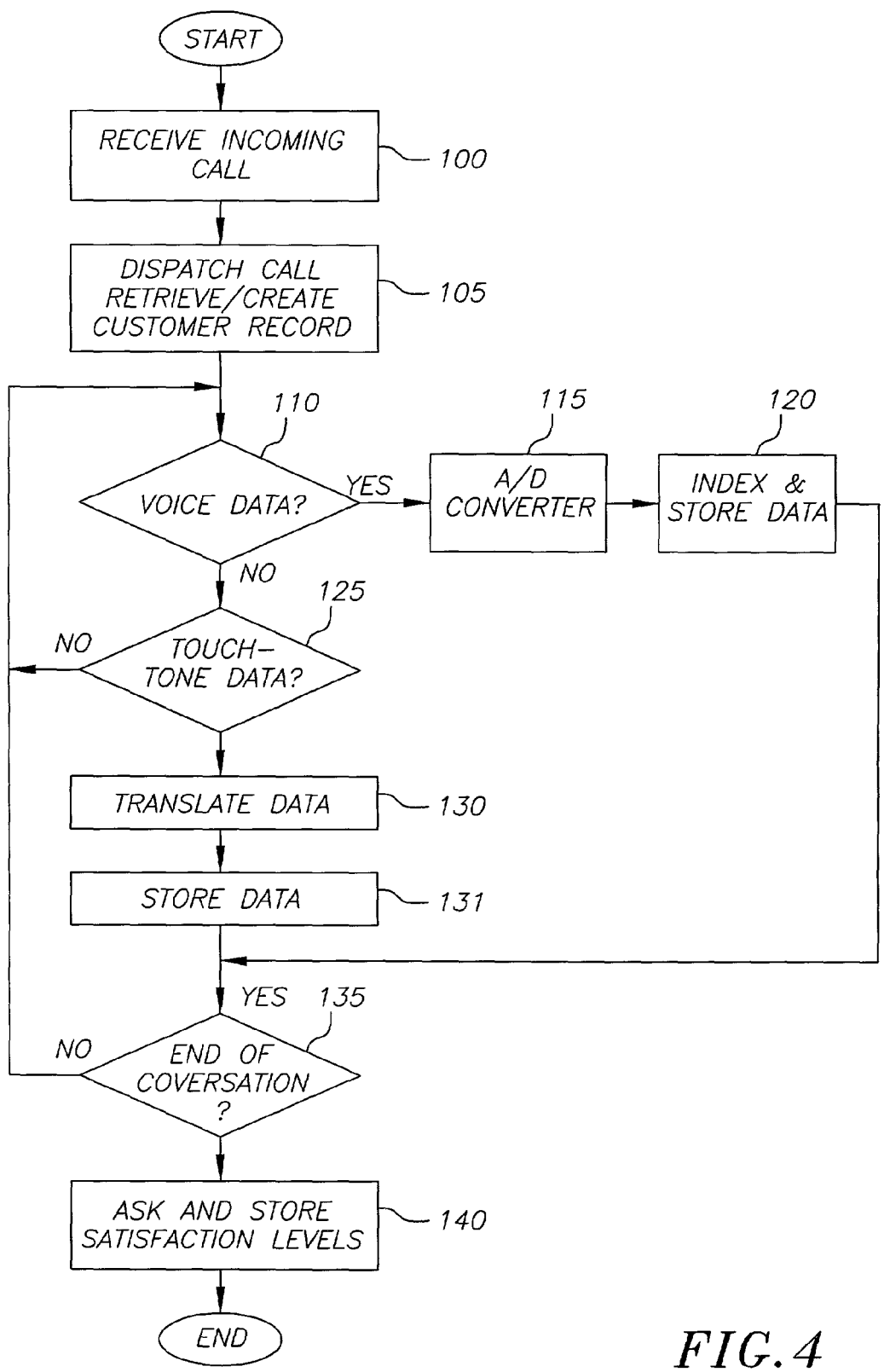
FIG. 4 is a flow diagram for processing an in-coming call according to one embodiment of the invention.

FIG. 4 is a flow diagram for processing an in-coming call and gathering user satisfaction data according to one embodiment of the invention. The process starts, and in step 100, the CTI server 20 receives an in-coming call from a particular customer. The CTI server, in step 105, dispatches the call to an available customer service representative, who either creates or retrieves a customer record from the customer information database 40b.

In step 110, the touch-tone recognition module 20b inquires if the call is transmitting voice data. If the answer is YES, the voice data is transferred, in step 115, to the analog to digital converter 20c to convert analog voice data to digital data. In step 120, the processing unit 20a receives the digital voice data and indexes and stores it in the voice storage database 40b.

If the call is not transmitting voice data, the touch-tone recognition module 20b inquires in step 125 whether the call is transmitting telephone signaling data, such as, for example, touch-tone data. If the answer is YES, the touch-tone recognition module 20b, in step 130, translates the telephone signaling data according to conventional mechanisms to a numeric value. The numeric value is assumed to be a customer satisfaction rating associated with a particular portion of the call. In step 131, the touch-tone recognition module transmits the numeric value to the processing unit 20a for storing as a customer satisfaction rating along with a time value indicating when the rating was received during the course of the call. A person skilled in the art should recognize, however, that the customer satisfaction level may also be represented by an alphanumeric letter corresponding to the transmitted touch-tone data.

In step 135, a determination is made as to whether the conversation with the customer service representative has ended. In this regard, either the customer service representative or customer via a touch-tone key press may transmit an end-of conversation message to the CTI server 20. Upon receipt of such end-of conversation message, the touch-tone recognition module 20*b*, in step 140, asks the customer pre-determined questions about the user satisfaction with regard to various aspects of the call. The user again uses his or her touch-tone phone to provide ratings for the various aspects. These ratings are stored in the customer record and the process ends. The analysis computer 30 may then access the customer satisfaction data for analysis and/or creation of statistical reports.

Although this invention has been described in certain specific embodiments, those skilled in the art will have no difficulty devising variations which in no way depart from the scope and spirit of the present invention. For example, although the present embodiment has been described as gathering customer satisfaction information for calls initiated by a customer to a customer service number, the same information may be gathered for calls received by a customer from a customer service representative. In addition, the satisfaction data may be gathered for other types of conversations, and not only conversations between customers and customer service representatives.

It is therefore to be understood that this invention may be practiced otherwise than is specifically described. Thus, the present embodiments of the invention should be considered in all respects as illustrative and not restrictive, the scope of the invention to be indicated by the appended claims and their equivalents rather than the foregoing description.

The invention claimed is:

1. A method for obtaining and analyzing customer satisfaction information, the method comprising:
    establishing telephonic communication between a first user and a second user, the second user providing a service to the first user during the telephonic communication;
    receiving signaling data during the telephonic communication, the signaling data corresponding to a particular voice portion of the telephonic communication;
    translating the signaling data to a satisfaction rating indicative of satisfaction with the service being provided by the second user during the particular voice portion of the telephonic communication, and;
    storing the satisfaction rating in a data store in association with an indicia identifying the particular voice portion of the telephonic communication for retrieving the satisfaction rating and the particular voice portion from respectively the data store and a voice data store for determining a customer satisfaction level.

2. The method of claim 1, wherein the signaling data is touch-tone data.

3. The method of claim 1 further comprising associating the satisfaction rating with the second user.

4. The method of claim 1, wherein the second user is a customer service representative.

5. The method of claim 1, further comprising presenting questions to the first user, at an end of the telephonic communication but before termination of the telephonic communication, a response by the first user being provided by selecting a touch-button corresponding to the response.

6. The method of claim 1, wherein the questions presented to the first user at an end of the telephonic communication but before termination of the telephonic communication, ask the first user to rate a waiting time for reaching the customer service representative, a result of the telephonic communication, or a behavior of the customer service representative.

7. The method of claim 1, wherein the indicia is a time value.

8. The method of claim 7, wherein the indicia is an offset time from beginning of the telephonic communication.

9. The method of claim 1 further comprising analyzing the satisfaction rating under control of an analysis computer for determining the customer satisfaction level.

* * * * *